United States Patent
Chung et al.

(10) Patent No.: US 8,451,580 B2
(45) Date of Patent: May 28, 2013

(54) MULTILAYER CERAMIC CAPACITOR CAPABLE OF CONTROLLING EQUIVALENT SERIES RESISTANCE

(75) Inventors: Hae Suk Chung, Seoul (KR); Byoung Hwa Lee, Gyunggi-do (KR); Eun Hyuk Chae, Gyunggi-do (KR); Eun Hye Choi, Gyunggi-do (KR); Kang Heon Hur, Gyunggi-do (KR); Dae Bok Oh, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/286,871

(22) Filed: Nov. 1, 2011

(65) Prior Publication Data
US 2012/0268860 A1    Oct. 25, 2012

(30) Foreign Application Priority Data
Apr. 21, 2011    (KR) .................. 10-2011-0037260

(51) Int. Cl.
*H01G 4/005*    (2006.01)
*H01G 4/06*    (2006.01)

(52) U.S. Cl.
USPC .......................................... 361/303; 361/311

(58) Field of Classification Search
USPC .................................... 36/303–305; 361/311
See application file for complete search history.

(56) References Cited

U.S. PATENT DOCUMENTS

| | | | |
|---|---|---|---|
| 7,310,217 B2 * | 12/2007 | Takashima et al. ........ | 361/306.3 |
| 2004/0042155 A1 | 3/2004 | Ritter et al. | |
| 2007/0121275 A1 | 5/2007 | Takashima et al. | |
| 2009/0201627 A1 | 8/2009 | Aoki | |
| 2009/0213525 A1 * | 8/2009 | Lee et al. ..................... | 361/303 |
| 2009/0244803 A1 * | 10/2009 | Lee et al. ................. | 361/301.4 |

FOREIGN PATENT DOCUMENTS

| | | |
|---|---|---|
| JP | 3832504 B2 | 7/2006 |
| KR | 10-2010-0036982 A | 4/2010 |

* cited by examiner

*Primary Examiner* — Eric Thomas
(74) *Attorney, Agent, or Firm* — McDermott Will & Emery LLP

(57) ABSTRACT

There is provided a multilayer ceramic capacitor capable of controlling equivalent series resistance (ESR) characteristics. The multilayer ceramic capacitor includes: a ceramic laminate including dielectric layers and a plurality of internal electrodes having different polarities and alternately stacked between the dielectric layers; and external electrodes formed on both sides of the ceramic laminate, wherein each of the internal electrodes includes a main electrode and a lead for connecting the main electrode to the external electrode, and an equivalent series resistance (ESR) value is determined by adjusting a ratio of a width to a length of the lead, whereby the ESR characteristics of the multilayer ceramic capacitor may be controlled.

4 Claims, 3 Drawing Sheets

MULTILAYER CERAMIC CAPACITOR CAPABLE OF CONTROLLING EQUIVALENT SERIES RESISTANCE

CROSS-REFERENCE TO RELATED APPLICATIONS

This application claims the priority of Korean Patent Application No. 10-2011-0037260 filed on Apr. 21, 2011, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor capable of controlling equivalent series resistance (ESR) characteristics.

2. Description of the Related Art

In accordance with the recent trend toward miniaturization in electronic devices, the use of a surface mounting substrate has increased. Therefore, chip components mounted on the surface mounting substrate have been continuously miniaturized. A capacitor, which is one of these chip components, has been widely used for various purposes in analog and digital electronic circuits.

A capacitor, an element capable of storing electricity therein, basically includes two electrodes opposing each other, such that when voltages are respectively applied thereto, electricity is accumulated in each of the electrodes. In a case in which a direct current (DC) voltage is applied to the capacitor, a current flows in the capacitor during the accumulation of electricity, yet does not flow therein when the accumulation of the electricity is completed. In addition, in the case in which an alternate current (AC) voltage is applied to the capacitor, polarities of the electrodes are alternated, such that an AC current continuously flows therein. The performance of the capacitor is represented by capacitance F. A multilayer capacitor capable of implementing high capacitance in spite of having a small size has been widely used. Particularly, the multilayer capacitor is widely used as a decoupling capacitor connected between a semiconductor chip and a power supply in a power supply circuit of a large scale integrated circuit (LSI), or the like.

Meanwhile, in order to be used in a central processing unit (CPU), a multilayer chip capacitor needs to have excellent decoupling characteristics. That is, in order to be used as a decoupling capacitor of the CPU, the multilayer chip capacitor needs to have: 1) low equivalent series inductance (ESL), 2) high capacitance, 3) an appropriate level of equivalent series resistance (ESR), 4) high temperature reliability, and the like. However, when the number of stacked layers is increased in order to implement high capacitance, an ESR value is reduced and a parallel resonance phenomenon between capacitors has been caused due to parallel connections between capacitors. However, when the ESR value of the capacitor is increased, an impedance curve becomes flat according to a frequency, and when capacitors having different capacitances are connected in parallel with each other, the parallel resonance phenomenon is also suppressed. Therefore, there is a need to more practically control the ESR characteristics of the capacitor.

SUMMARY OF THE INVENTION

An aspect of the present invention provides a multilayer ceramic capacitor capable of controlling equivalent series resistance (ESR) characteristics.

According to an aspect of the present invention, there is provided a multilayer ceramic capacitor including: a ceramic laminate including dielectric layers and a plurality of internal electrodes having different polarities and alternately stacked between the dielectric layers; and external electrodes formed on both sides of the ceramic laminate, wherein each of the internal electrodes includes a main electrode and a lead for connecting the main electrode to the external electrode, and an equivalent series resistance (ESR) value is determined by adjusting a ratio of a width to a length of the lead.

The ratio of the width to the length of the lead may be varied between upper and lower portions of the ceramic laminate, and be gradually reduced from an upper portion of the ceramic laminate toward a lower portion thereof or be gradually increased from an upper portion of the ceramic laminate toward a lower portion thereof.

The ratio of the width to the length of the lead may be relatively large in a central portion of the ceramic laminate, as compared to an upper portion or a lower portion thereof, or be different for each dielectric layer or be the same in all the dielectric layers.

The main electrode may be connected to at least two leads, and a lead of an internal electrode having a positive (+) polarity and a lead of an internal electrode having a negative (−) polarity may be disposed in an adjacent interdigitated arrangement.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
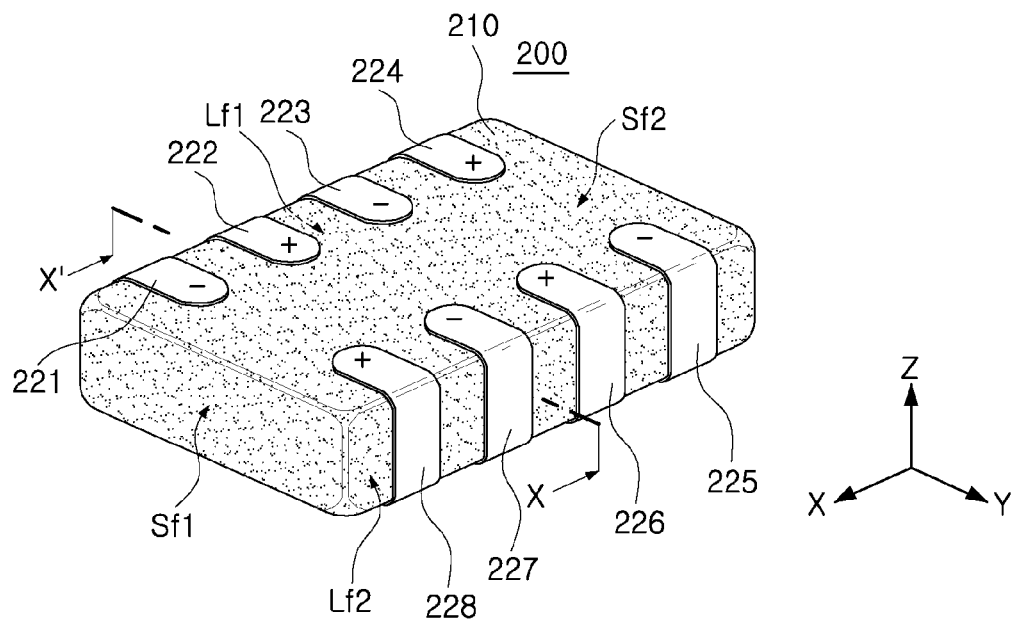
FIG. 1 is a perspective view of a multilayer ceramic capacitor manufactured according to an embodiment of the present invention.

Embodiments of the present invention will now be described with reference to the accompanying drawings. The embodiments of the present invention may be modified in many different forms and the scope of the invention should not be construed as being limited to the embodiments set forth herein. Rather, these embodiments are provided so that this disclosure will be thorough and complete, and will fully convey the concept of the invention to those skilled in the art. Therefore, it is to be noted that the shape and size of components shown in the drawings may be exaggerated for clarity.

Figure 2:
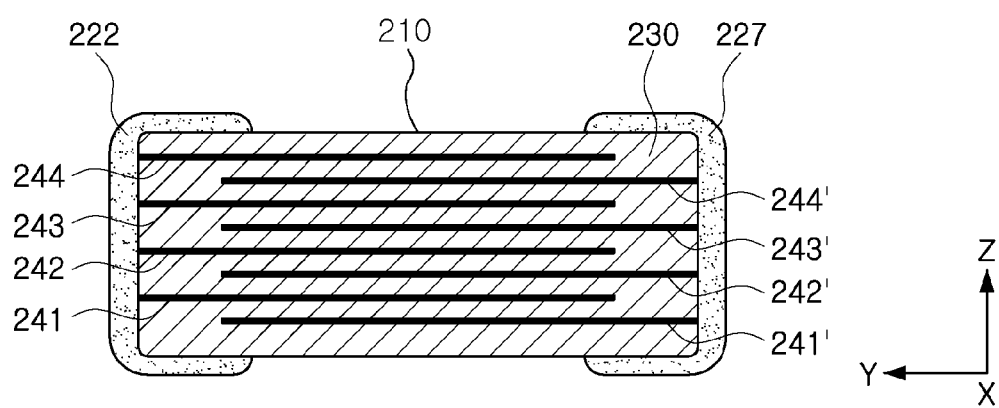
FIG. 2 is a schematic cross-sectional view of a multilayer ceramic capacitor taken along line X-X' of FIG. 1.

FIG. 1 is a perspective view of a multilayer ceramic capacitor manufactured according to an embodiment of the present invention; FIG. 2 is a schematic cross-sectional view of a multilayer ceramic capacitor taken along line X-X' of FIG. 1; and FIG. 3 is a plan view showing a structure of an internal electrode of a multilayer ceramic capacitor according to an embodiment of the present invention.

Figure 3:
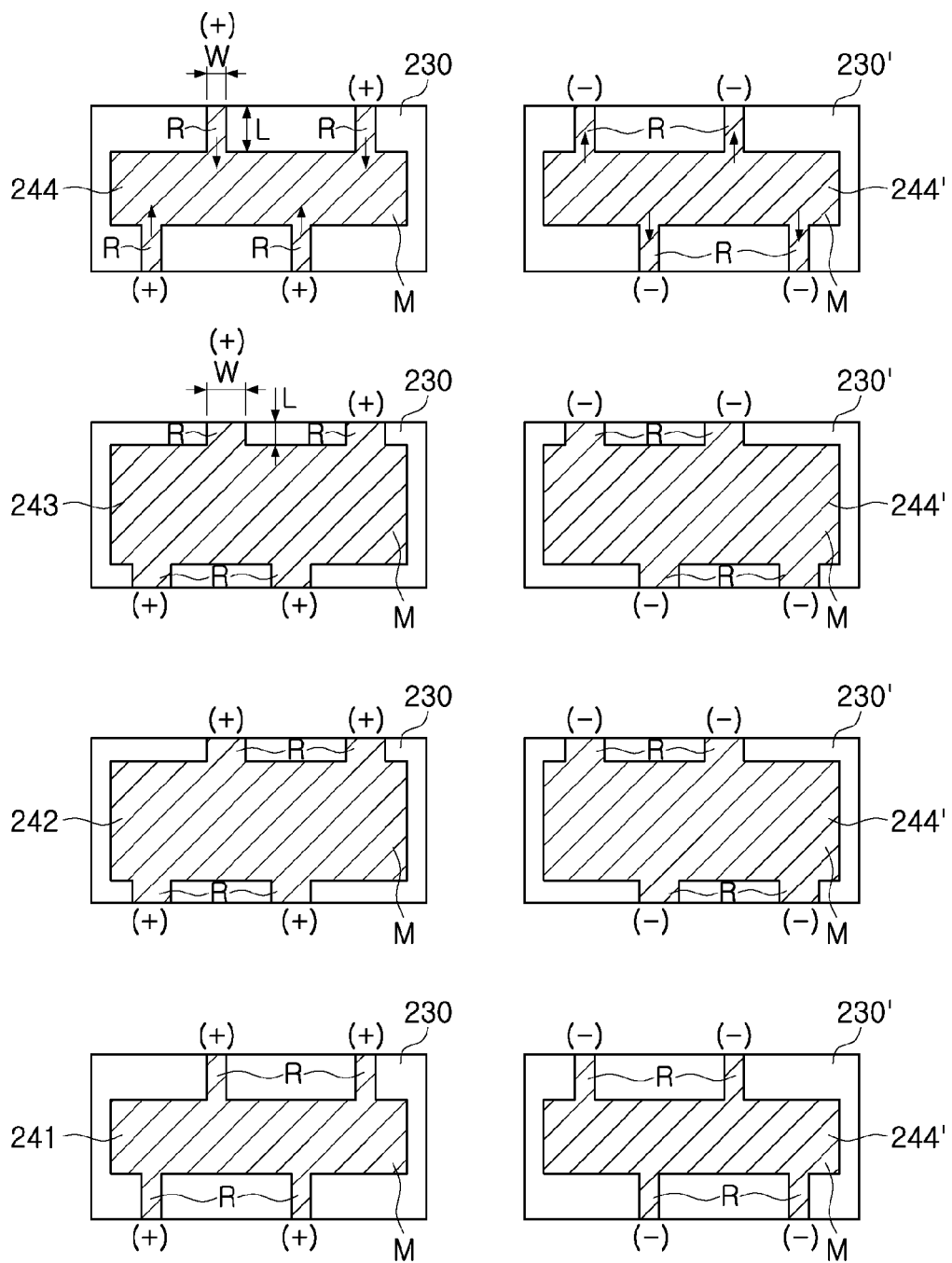
FIG. 3 is a plan view showing a structure of an internal electrode of a multilayer ceramic capacitor according to an embodiment of the present invention.

Referring to FIGS. 1 through 3, a multilayer ceramic capacitor 200 according to the present embodiment includes a rectangular parallelepiped shaped ceramic laminate 210 and a plurality of external electrodes (first external electrodes 222, 224, 226, and 228 and second external electrodes 221, 223, 225, and 227) formed on sides of the ceramic laminate 210. The ceramic laminate 210 is formed by stacking a plurality of dielectric layers (represented by a reference numeral 230 in FIGS. 2 and 3), and has a plurality of internal electrodes (first internal electrodes 241, 242, 243, and 244 and second internal electrodes 241', 242', 243', and 244') stacked therein, having the dielectric layer 230 therebetween.

The first external electrodes 222, 224, 226, and 228 and the second external electrodes 221, 223, 225, and 227 are disposed to be adjacent to each other on two side surfaces Lf1 and Lf2 of the ceramic laminate 210. In this case, the first internal electrodes 241, 242, 243, and 244 are only connected to the first external electrodes 222, 224, 226, and 228, and the second internal electrodes 241', 242', 243', and 244' are only connected to the second external electrodes 221, 223, 225, and 227.

In this case, as shown in FIGS. 1 through 3, the first external electrodes 222, 224, 226, and 228 have a positive (+) polarity and are connected to the first internal electrodes 241, 242, 243, and 244, while the second external electrodes 221, 223, 225, and 227 have a negative (−) polarity and are connected to the second internal electrodes 241', 242', 243', and 244'.

Therefore, capacitance components may be generated between the first internal electrodes 241, 242, 243, and 244 having the positive (+) polarity and the second internal electrodes 241', 242', 243', and 244' having the negative (−) polarity. Meanwhile, references Sf1 and Sf2 (not described) refer to two end surfaces of the ceramic laminate 210.

The first internal electrodes 241, 242, 243, and 244 and the second internal electrodes 241', 242', 243', and 244' are alternately stacked in a sequence of 241'-241-242'-242-243'-243-244'-244 from a lower portion of the ceramic laminate 210. In addition, as shown in FIG. 3, each of the first internal electrodes 241, 242, 243, and 244 and the second internal electrodes 241', 242', 243', and 244' may include at least two leads R for connecting a main electrode M to the first external electrodes 222, 224, 226, and 228 having the positive (+) polarity and the second external electrodes 221, 223, 225, and 227 having the negative (−) polarity, respectively.

In addition, the leads R of the first internal electrodes 241, 242, 243, and 244 connected to the first external electrodes 222, 224, 226, and 228 having the positive (+) polarity and the leads R of the second internal electrodes 241', 242', 243', and 244' connected to the second external electrodes 221, 223, 225, and 227 having the negative (−) polarity are disposed in an adjacent interdigitated arrangement. Since currents flow in opposite directions in the adjacent leads R having different polarities, as represented by arrows (See FIG. 3), a magnetic flux generated by a high frequency current is partially cancelled, whereby equivalent series inductance (ESL) may be reduced.

Meanwhile, according to an embodiment of the present invention, as shown in FIG. 3, the leads R of each layer of the multilayer ceramic capacitor 200 have a predetermined width W and length L. Equivalent series resistance (ESR) characteristics of the multilayer ceramic capacitor 200 may be controlled by ratios of the widths W to the lengths L of the leads R of each layer of the multilayer ceramic capacitor 200. Here, ESR indicates ESR provided by a pair of adjacent internal electrodes 241-241', 242-242', 243-243', and 244-244' opposing each other and having different polarities.

According to an embodiment of the present invention, the ratio of the width W to the length L of the lead R of the internal electrode may be different in each dielectric layer or be the same in all dielectric layers.

According to an embodiment of the present invention, the ratio of the width W to the length L of the lead R of the internal electrode may be varied between upper and lower portions of the ceramic laminate 210.

More specifically, according to an embodiment of the present invention, the ratio of the width W to the length L of the lead R of the internal electrode may be gradually reduced from the upper portion of the ceramic laminate 210 toward the lower portion thereof or be gradually increased from the upper portion of the ceramic laminate 210 toward the lower portion thereof.

In addition, the ratio of the width W to the length L of the lead R of the internal electrode may be relatively larger in a central portion of the ceramic laminate 210, as compared to the upper portion or the lower portion thereof.

ESRs were measured, while the size of the multilayer ceramic capacitor was changed according to embodiments of the present invention. The measurement result is provided in Table 1 below. A ratio of a width W to a length L of a lead R in Table 1 was calculated by averaging ratios of widths W to lengths L of leads R of each layer of the multilayer ceramic capacitor.

TABLE 1

| Size | Ratio Of Width W To Length L Of Lead R | ESR (mΩ) |
|---|---|---|
| 1608 | 3 | 8 |
| 1608 | 4 | 10 |
| 1608 | 5 | 15 |
| 1608 | 6 | 20 |
| 2102 | 3 | 10 |
| 2102 | 4 | 16 |
| 2102 | 5 | 21 |
| 2102 | 6 | 28 |

ESRs were measured according to the size of the multilayer ceramic capacitor while a ratio of a width W to a length L of a lead R of an internal electrode was changed according to an embodiment of the present invention. The measurement result is provided in Table 2 below.

TABLE 2

| Distribution Of Internal Electrodes | Size | Ratio Of Width W To Length Of Lead R | | | Total Number Of Stacked Layers | ESR (mΩ) |
|---|---|---|---|---|---|---|
| | | $L_1$ | $L_2$ | $L_3$ | | |
| Uniformity of Distribution | 1608 | 120 | — | — | 120 | 8.3 |
| | | 110 | 10 | — | 120 | 10.6 |
| | | 100 | 20 | — | 120 | 15.7 |
| | | 80 | 40 | — | 120 | 30.4 |
| | | 50 | 70 | — | 120 | 72.5 |
| | | 20 | 100 | — | 120 | 110.5 |
| | 1608 | 120 | — | — | 120 | 8.3 |
| | | 110 | — | 10 | 120 | 15.6 |
| | | 100 | — | 20 | 120 | 21.3 |
| | | 80 | — | 40 | 120 | 35.2 |
| | | 50 | — | 70 | 120 | 83.4 |
| | | 20 | — | 100 | 120 | 140.3 |
| | 2012 | 120 | — | — | 120 | 10.7 |
| | | 110 | 10 | — | 120 | 12.4 |
| | | 100 | 20 | — | 120 | 20.5 |
| | | 80 | 40 | — | 120 | 42.3 |

TABLE 2-continued

| Distribution Of Internal Electrodes | Size | Ratio Of Width W To Length Of Lead R | | | Total Number Of Stacked Layers | ESR (mΩ) |
|---|---|---|---|---|---|---|
| | | $L_1$ | $L_2$ | $L_3$ | | |
| | | 50 | 70 | — | 120 | 86.4 |
| | | 20 | 100 | — | 120 | 121.7 |
| | 2012 | 120 | — | — | 120 | 10.7 |
| | | 110 | — | 10 | 120 | 22.3 |
| | | 100 | — | 20 | 120 | 35.4 |
| | | 80 | — | 40 | 120 | 63.3 |
| | | 50 | — | 70 | 120 | 96.4 |
| | | 20 | — | 100 | 120 | 135.8 |
| Lower Portion Concentration | 1608 | 120 | — | — | 120 | 8.3 |
| | | 110 | 10 | — | 120 | 42.7 |
| | | 100 | 20 | — | 120 | 65.3 |
| | | 80 | 40 | — | 120 | 85.1 |
| | | 50 | 70 | — | 120 | 93.4 |
| | | 20 | 100 | — | 120 | 112.5 |
| | 1608 | 120 | — | — | 120 | 8.3 |
| | | 110 | — | 10 | 120 | 58.6 |
| | | 100 | — | 20 | 120 | 76.4 |
| | | 80 | — | 40 | 120 | 92.6 |
| | | 50 | — | 70 | 120 | 102.4 |
| | | 20 | — | 120 | 120 | 132.4 |
| | 2012 | 120 | — | — | 120 | 10.7 |
| | | 110 | 10 | — | 120 | 49.5 |
| | | 100 | 20 | — | 120 | 74.3 |
| | | 80 | 40 | — | 120 | 86.4 |
| | | 50 | 70 | — | 120 | 100.5 |
| | | 20 | 100 | — | 120 | 121.7 |
| | 2012 | 120 | — | — | 120 | 10.7 |
| | | 110 | — | 10 | 120 | 58.4 |
| | | 100 | — | 20 | 120 | 89.3 |
| | | 80 | — | 40 | 120 | 98.4 |
| | | 50 | — | 70 | 120 | 110.4 |
| | | 20 | — | 100 | 120 | 143.5 |

In Table 2, $L_1$ indicates the number of stacked internal electrodes having a ratio of a width W to a length L of a lead R of 1, $L_2$ indicates the number of stacked internal electrodes having a ratio of a width W to a length L of a lead R of 0.3, and $L_3$ indicates the number of stacked internal electrodes having a ratio of a width W to a length L of a lead R of 0.

In addition, in Table 2, uniformity of distribution means a case in which layers having different ratios of a width W to a length L of a lead R of an internal electrode are uniformly provided over a laminate, and lower portion concentration means a case in which layers having relatively high ESRs among layers having different ratios of a width W/a length L of a lead R of an internal electrode are concentratedly stacked on a lower portion of a laminate and other layers are then stacked thereon, unlike the uniformity of distribution. For example, the lower portion concentration means that ten layers having a ratio of a width W to a length L of a lead R of 0.3 are concentratedly disposed on the lower portion of the laminate and one hundred and ten layers having a ratio of a width W to a length L of a lead R of 1 are stacked thereon.

Referring to Tables 1 and 2, the ratios of widths W to lengths L of leads R of individual layers of the ceramic laminate are changed, whereby the ESR characteristics of the multilayer ceramic capacitor may be controlled.

Figure 4A:
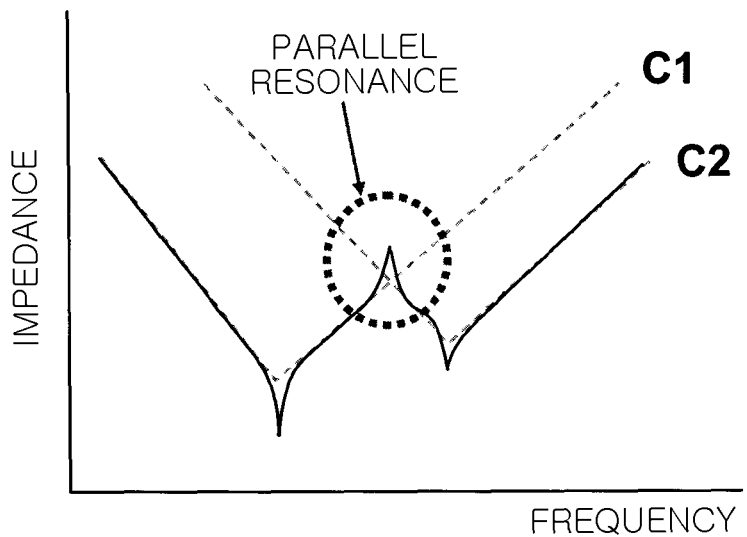
FIGS. 4A and 4B are, respectively, a graph showing that a parallel resonance phenomenon is generated when multilayer ceramic capacitors are connected in parallel with each other and a graph showing that a parallel resonance phenomenon may be suppressed by increasing equivalent series resistance (ESR) characteristics according to an embodiment of the present invention.

Meanwhile, in order to be used in a central processing unit (CPU), a multilayer chip capacitor needs to have excellent decoupling characteristics. That is, it order to be used as a decoupling capacitor of the CPU, the multilayer chip capacitor needs to have low equivalent series inductance (ESL), high capacitance, an appropriate level of equivalent series resistance (ESR), high temperature reliability, and the like. However, when the number of stacked layers is increased in order to implement high capacitance, an ESR value is reduced and a parallel resonance phenomenon between capacitors has been caused due to parallel connection between the capacitors, as shown in FIG. 4A.

Figure 4B:
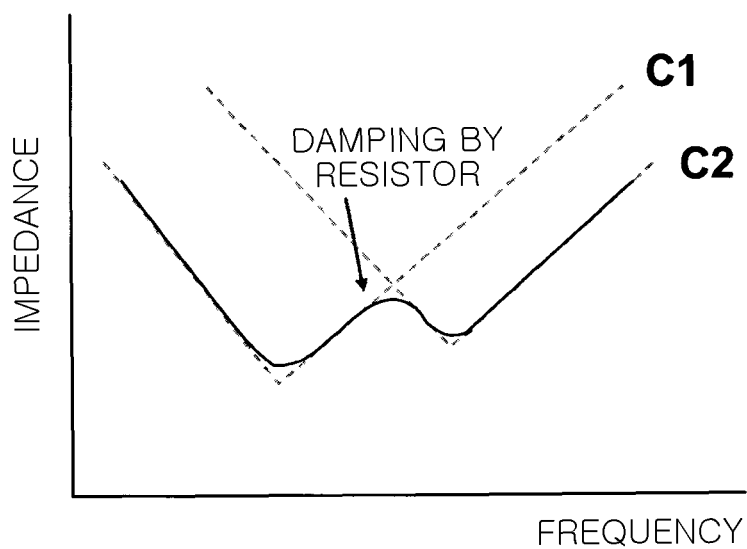

However, when the ESR value of the capacitor is increased as shown in FIG. 4B, an impedance curve becomes flat according to a frequency, and when capacitors having different capacitances are connected in parallel with each other, the parallel resonance phenomenon is also suppressed. Therefore, there is a need to more practically control the ESR characteristics of the capacitor.

According to the embodiment of the present invention, the ESR of the multilayer ceramic capacitor may be calculated through various embodiments such as the above-mentioned first to third embodiments, whereby the ESR characteristics of the multilayer ceramic capacitor may be controlled.

As set forth above, according to embodiments of the present invention, ESR value is determined by adjusting a ratio of a width to a length of a lead for connecting a main electrode of an internal electrode to an external electrode, whereby the ESR characteristics of a multilayer ceramic capacitor may be controlled.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor, comprising:
   a ceramic laminate including dielectric layers and a plurality of internal electrodes having different polarities and alternately stacked between the dielectric layers; and
   external electrodes formed on both sides of the ceramic laminate, wherein:
   each of the internal electrodes includes a main electrode and a lead for connecting the main electrode to the external electrodes, and
   a ratio of $L_2$ to $L_1$ ($L_2/L_1$) ranges from 0.1 to 5.0, where $L_1$ is a number of stacked internal electrodes having a first lead and the ratio of a width of the first lead to a length of the first lead is 1, and where $L_2$ is a number of stacked internal electrodes having a second lead and the ratio of a width of the second lead to a length of the second lead is 0.3.

2. The multilayer ceramic capacitor of claim 1, wherein the main electrode is connected to at least two leads.

3. The multilayer ceramic capacitor of claim 1, wherein a lead of an internal electrode having a positive (+) polarity and a lead of an internal electrode having a negative (−) polarity are disposed in an adjacent interdigitated arrangement.

4. The multilayer ceramic capacitor of claim 1, wherein:
   the internal electrodes having the second lead are concentratedly disposed on a lower portion of the laminate, where the ratio of a width of the second lead to a length of the second lead is 0.3, and
   the internal electrodes having the first lead are stacked on the internal electrodes having the second lead, where the ratio of a width of the first lead to a length of the first lead is 1.

* * * * *